(12) United States Patent
Clarey et al.

(10) Patent No.: US 6,724,591 B2
(45) Date of Patent: Apr. 20, 2004

(54) CIRCUIT INTERRUPTER EMPLOYING A MECHANISM TO OPEN A POWER CIRCUIT IN RESPONSE TO A RESISTOR BODY BURNING OPEN

(75) Inventors: Robert J. Clarey, Pittsburgh, PA (US); Robert Tracy Elms, Monroeville, PA (US); Richard Paul Sabol, North Strabane Township, PA (US)

(73) Assignee: Eaton Corporation, Cleveland, OH (US)

(*) Notice: Subject to any disclaimer, the term of this patent is extended or adjusted under 35 U.S.C. 154(b) by 186 days.

(21) Appl. No.: 10/003,588

(22) Filed: Nov. 15, 2001

(65) Prior Publication Data

US 2003/0090848 A1 May 15, 2003

(51) Int. Cl.[7] .................................................. H02H 3/00
(52) U.S. Cl. ........................................................ 361/42
(58) Field of Search .......................... 361/42, 114, 115, 361/62–70, 93–97, 103, 104, 99, 102, 78–87; 335/18, 6, 8, 9, 38–41, 59–67, 172–176, 239, 240

(56) References Cited

U.S. PATENT DOCUMENTS

| | | | |
|---|---|---|---|
| 3,987,340 A | * 10/1976 | Kussy | 361/31 |
| 4,031,431 A | 6/1977 | Gross | 307/326 |
| 4,051,544 A | 9/1977 | Vibert | 361/45 |
| 4,081,852 A | 3/1978 | Coley et al. | 361/45 |
| 4,791,523 A | * 12/1988 | Pick et al. | 361/104 |
| 4,833,564 A | 5/1989 | Pardue et al. | 361/93.6 |
| 5,260,676 A | 11/1993 | Patel et al. | 335/18 |
| 5,293,522 A | 3/1994 | Fello et al. | 335/18 |
| 5,459,630 A | 10/1995 | MacKenzie et al. | 361/45 |
| 5,477,412 A | 12/1995 | Neiger et al. | 361/45 |
| 5,600,524 A | 2/1997 | Neiger et al. | 361/42 |
| 5,715,125 A | 2/1998 | Neiger et al. | 361/42 |
| 5,801,912 A | 9/1998 | Gershen et al. | 361/50 |
| 5,831,509 A | 11/1998 | Elms et al. | 337/333 |
| 5,896,262 A | 4/1999 | Rae et al. | 361/94 |
| 6,005,757 A | * 12/1999 | Shvach et al. | 361/64 |
| 6,040,967 A | 3/2000 | DiSalvo | 361/42 |
| 6,262,871 B1 | 7/2001 | Nemir et al. | 361/42 |
| 6,420,948 B1 | * 7/2002 | Runyan | 335/6 |
| 6,487,057 B1 | * 11/2002 | Natili | 361/42 |
| 6,577,478 B2 | * 6/2003 | Kim et al. | 361/78 |
| 6,621,388 B1 | * 9/2003 | Macbeth | 361/42 |

* cited by examiner

*Primary Examiner*—Pia Tibbits
(74) *Attorney, Agent, or Firm*—Martin J. Moran

(57) ABSTRACT

A GFCI/AFCI circuit breaker includes a housing, separable contacts, and an operating mechanism for opening and closing the separable contacts. A first trip mechanism includes a GFCI/AFCI trip circuit having a resistor. The resistor is energized in response to a trip condition. The first trip mechanism cooperates with the operating mechanism to trip open the separable contacts in response to the trip condition. The resistor has a body which burns open in response to a failure of the separable contacts to trip open. A second trip mechanism engages the body of the resistor and cooperates with the operating mechanism to trip open the separable contacts in response to the body of the resistor burning open.

24 Claims, 6 Drawing Sheets

CIRCUIT INTERRUPTER EMPLOYING A MECHANISM TO OPEN A POWER CIRCUIT IN RESPONSE TO A RESISTOR BODY BURNING OPEN

CROSS-REFERENCE TO RELATED APPLICATION

This application is related to commonly assigned, U.S. Pat. No. 6,487,057 entitled "Ground Fault Current Interrupter/Arc Fault Current Interrupter Circuit Breaker With Fail Safe Mechanism".

BACKGROUND OF THE INVENTION

1. Field of the Invention

This invention relates to circuit interrupters and, more particularly, to ground fault and/or arc fault current interrupters and, more particularly, to circuit breakers having a mechanism for opening the associated power circuit in the event of a failure of the circuit breaker separable contacts to trip open, such as, for example, a failure in a ground fault and/or arc fault trip circuit.

2. Background Information

In small circuit breakers, commonly referred to as miniature circuit breakers, used for residential and light industrial applications, overcurrent protection is typically provided by a thermal-magnetic trip device. This trip device typically includes a bimetal strip that is heated and bends in response to a persistent overload condition. The bimetal, in turn, unlatches a spring powered operating mechanism that opens the separable contacts of the circuit breaker to interrupt current flow in the protected power system.

For short circuit protection, an armature, which is attracted by sizable magnetic forces generated in a magnetic core by a short circuit, unlatches, or trips, a circuit breaker operating mechanism. As an example, the magnetic type actuation occurs when the hot line conductor becomes directly connected with ground or neutral, thereby bypassing the load. In many applications, a miniature circuit breaker may also provide ground fault and/or arc fault protection.

Ground fault current interrupter (GFCI) and arc fault current interrupter (AFCI) circuit breakers are well known in the art. Examples of ground fault and arc fault circuit breakers are disclosed in U.S. Pat. Nos. 4,081,852; 5,260,676; 5,293,522; and 5,896,262. In ground fault circuit breakers, an electronic circuit typically detects leakage of current to ground and generates a ground fault trip signal. This trip signal energizes a trip solenoid, which unlatches the operating mechanism, often through deflection of the armature of the thermal-magnetic trip device.

In conventional ground fault circuit breakers, the ground fault detection circuit is powered from the load side of the circuit breaker such that the detection circuit is not powered after the circuit breaker has detected a ground fault and, thus, has tripped. In this manner, the circuit breaker separable contacts are employed as a cut-off switch to remove power to and, thus, protect the ground fault detection circuit.

When a ground fault circuit interrupter (GFCI), arc fault circuit interrupter (AFCI) or wall outlet GFCI/AFCI unit is called upon to trip, the circuit interrupter or outlet unit trips open the separable contacts of the device. For example, the tripping may be started by using a Push to Test button on the front of the unit, by using a remote tester, or because of a real world arc fault or ground fault.

In the event of a failure in the electronic trip circuit, such as a component failure that disables the trip circuit, the circuit breaker can remain energized after the failure. It is desirable to provide a fail-safe mechanism that would open the separable contacts of the breaker in the event of such failure. It is further desirable to provide a mechanism for preventing resetting of the circuit breaker once the separable contacts have been opened as a result of such failure.

It is known to employ a ground fault detection circuit in a hair dryer. In response to a ground fault, an SCR is fired to electrically connect a resistor between line and neutral conductors. In turn, whenever the resistor opens, a plunger is released to open a set of contacts to open the power circuit to the hair dryer.

There have been reports that some circuit breakers and other types of AFCI and/or GFCI devices might not be able to trip open when called upon to trip and, thus, fail to open the separable contacts as required.

There is a need, therefore, for a mechanism to ensure that the power circuit is opened if a ground fault, arc fault, test method or other trip source calls upon the device to trip to an open position.

SUMMARY OF THE INVENTION

The present invention meets this need and others and employs a mechanism to open the power circuit of the circuit interrupter and to prevent the circuit interrupter from being reset. In accordance with the invention, a trip circuit includes a resistor, which is energized in response to a trip condition. The resistor has a body, which burns open in response to a failure of the separable contacts to trip open. A means engages the body of the resistor. A means responsive to that means opens the power circuit in response to the body of the resistor burning open. Hence, the device will have to be replaced since the power circuit will become open and require the user to take immediate action.

As one aspect of the invention, a circuit interrupter comprises: a housing; separable contacts; an operating mechanism for opening and closing the separable contacts; a first trip mechanism including a trip circuit having a resistor, which is energized in response to a trip condition, the first trip mechanism cooperating with the operating mechanism to trip open the separable contacts in response to the trip condition, the resistor having a body which burns open in response to a failure of the separable contacts to trip open; and a second trip mechanism engaging the body of the resistor and cooperating with the operating mechanism to trip open the separable contacts in response to the body of the resistor burning open.

The operating mechanism may include a trip latch, and the first trip mechanism may include a solenoid having a coil and a plunger. The trip circuit energizes the coil through the resistor in response to the trip condition. The energized coil normally moves the plunger to engage the trip latch to trip open the separable contacts in response to the trip condition. The body of the resistor burns open in response to the plunger failing to trip open the separable contacts through the trip latch in response to the trip condition.

The second trip mechanism may include a trip member and a spring biasing the trip member toward the trip latch. The body of the resistor normally blocks the trip member, and burns open to release the trip member and trip open the separable contacts through the trip latch in response to the plunger failing to trip open the separable contacts through the trip latch in response to the trip condition.

As another aspect of the invention, a circuit interrupter comprises: a housing; first separable contacts within the housing; an operating mechanism for opening and closing the first separable contacts; a trip circuit including a resistor, which is energized in response to a trip condition, the trip circuit cooperating with the operating mechanism to trip open the first separable contacts in response to the trip condition, the resistor having a body which burns open in response to a failure in the trip circuit; second separable contacts electrically connected in series with the first separable contacts; a movable contact arm having an open position for opening the second separable contacts and having a closed position for closing the second separable contacts, the movable contact arm held in the closed position thereof by the body of the resistor, the movable contact arm being movable to the open position thereof in response to the body of the resistor burning open; and a spring which biases the movable contact arm toward the open position thereof.

The operating mechanism may include a trip latch. The first separable contacts are adapted to receive a line voltage. The trip circuit may include an SCR and a solenoid having a coil and a plunger. The trip circuit energizes the coil with the line voltage through the resistor and the SCR in response to the trip condition. The energized coil normally moves the plunger to engage the trip latch to trip open the separable contacts in response to the trip condition. The body of the resistor burns open in response to the plunger failing to trip open the separable contacts through the trip latch in response to the trip condition.

As a further aspect of the invention, a circuit interrupter comprises: a housing; a line terminal; a load terminal; a power circuit including separable contacts electrically connected between the line terminal and the load terminal; an operating mechanism for opening and closing the separable contacts; a trip circuit including a resistor, which is energized in response to a trip condition, the trip circuit cooperating with the operating mechanism to trip open the separable contacts in response to the trip condition, the resistor having a body which burns open in response to a failure of the separable contacts to trip open; means for engaging the body of the resistor; and means responsive to the means for engaging for opening the power circuit in response to the body of the resistor burning open.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
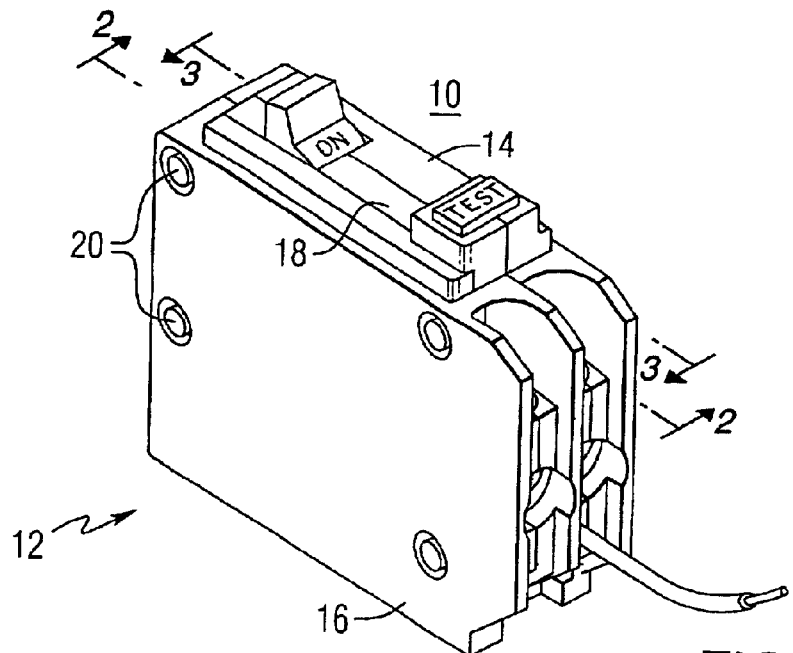
FIG. 1 is an isometric view of a ground fault circuit breaker.

FIG. 1 shows a ground fault circuit breaker 10 including a housing 12, which is made of electrically insulating material such as a thermosetting resin. The housing 12 includes a pair of tray portions 14 and 16 and a side cover 18, which are secured in place by a suitable mechanism, such as rivets 20, in a conventional manner.

Figure 2:
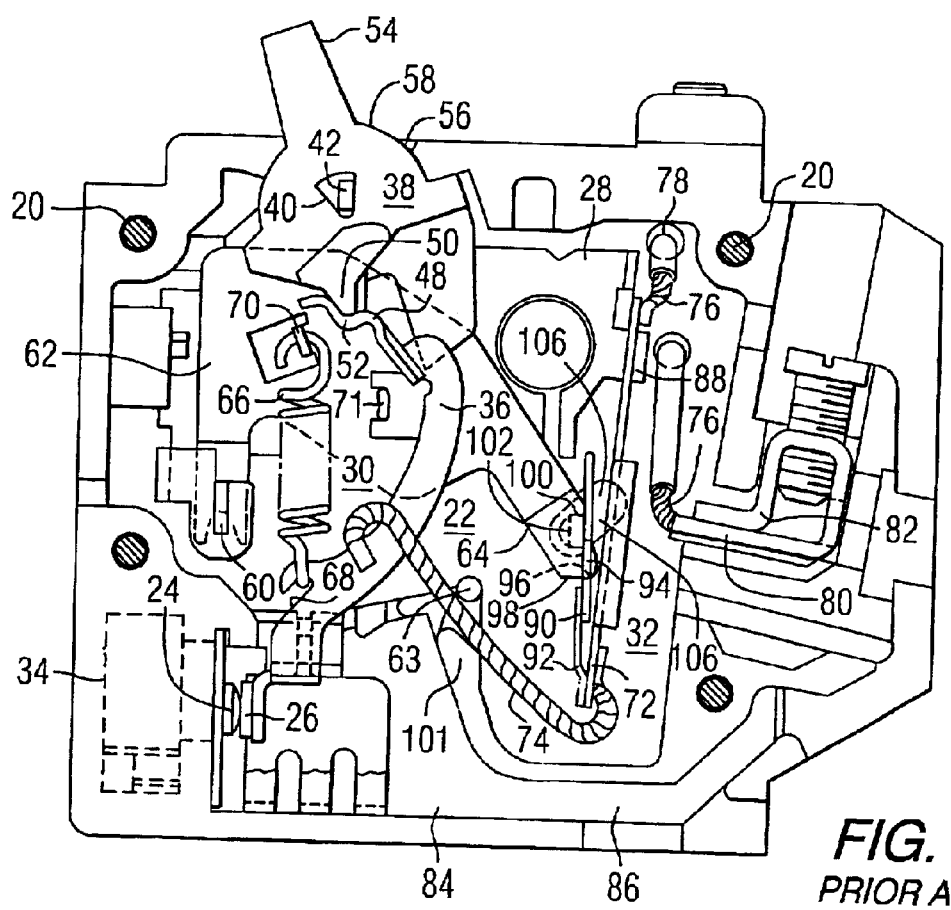
FIG. 2 is a vertical sectional view taken on lines 2—2 of FIG. 1 and showing the circuit breaker in the closed position.
Figure 3:
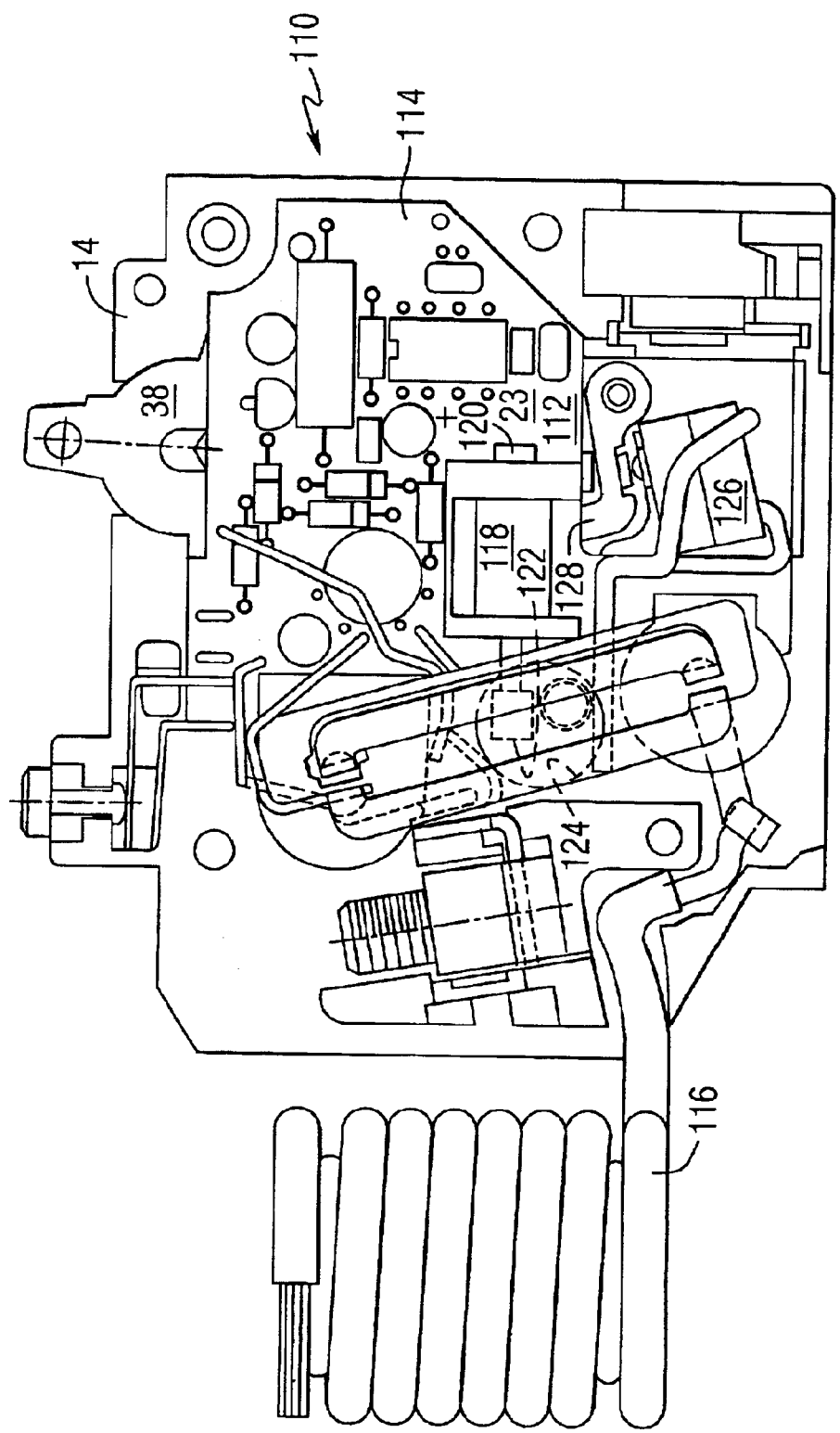
FIG. 3 is a vertical sectional view taken on lines 3—3 of FIG. 1 showing the electronic trip circuit.

As shown in respective FIGS. 2 and 3, a circuit breaker mechanism 22 is disposed within one compartment of the housing 12 and a ground fault interrupter circuit 23 is disposed within another compartment of housing 12. The circuit breaker mechanism 22 comprises a stationary contact 24, a movable contact 26, a supporting metal frame 28, an operating mechanism 30, and a trip device 32. The stationary contact 24 is welded, or otherwise suitably secured, to a clip-on line terminal 34 that is disposed within an opening or plug-in cavity, in order to resiliently engage a blade in a load-center or panelboard (not shown) when the circuit breaker 10 is mounted in the operating position.

The stationary contact 24 cooperates with the movable contact 26, which is welded, or otherwise suitably secured, to a small flange portion of a flat metallic generally C-shaped contact arm 36. A mechanism for operating the contact arm 36 to the open and closed positions thereof comprises an operating member 38 having a V-shaped opening 40 therein, which opening receives a projection 42 of the stationary frame 28. The operating member 38 is biased outwardly or upward, to a position wherein the lower edges of the projection 42 pivotally engage the lower sidewalls of the V-shaped opening 40. The contact arm 36 is bent over at its upper end, at part 48, and a slot (not shown) is provided in the part 48. Depressions 52 (only one is shown in FIG. 2) are formed in the part 48 on opposite sides of the slot. When the operating member 38 and contact arm 36 are in operating position, a molded projection (not shown) integral with the operating member 38 extends into the slot of the contact arm 36 to position the operating member 38 relative to the contact arm 36, and pivoting portions 50 (only one is shown in FIG. 2) on opposite sides of the projection pivotally engage in the depressions 52 of the contact arm part 48.

The operating member 38 has a handle portion 54 molded integral therewith which extends through an opening 56 in the housing 12, whereby the handle portion 54 may be manually operated to open and close the circuit breaker 10. Arcuate surfaces 58 on opposite sides of the handle portion 54 substantially close the opening 56 in all positions of the operating member 38. Motion is transmitted from the operating member 38 to the contact arm 36 when the circuit breaker 10 is manually operated. When the breaker is automatically tripped, motion is transmitted from the contact arm 36 to the operating member 38.

The frame 28 supports an insulating pivot 60. A releasable member 62 is pivotally supported at one end thereof on the pivot 60. The other end 64 of the releasable member 62 is latched by the trip device 32. The ends of the releasable member 62 are offset and disposed along a plane which is parallel to a plane in which the main body portion of the releasable member 62 is disposed. A spring 66 is connected, under tension, at one end in a slot 68 in contact arm 36, and at the other end in a slot projection 70 that extends from the main body portion of the releasable member 62.

The contact arm 36 is electrically connected to the lower end of a bimetal 72 by a flexible conductor 74. The bimetal 72 is part of the trip device 32. A flexible conductor 76 connects the upper end of the bimetal 72 with a terminal strap 78 that extends through an opening in the end wall of the housing 12. A terminal connector 80 is connected to the flexible conductor 76 and to the external end of the terminal strap 82, in order to permit connection of the circuit breaker 10 in a power circuit in a manner well known in the art. The closed power circuit through the circuit breaker 10 extends from the terminal 34 through the stationary contact 24, movable contact 26, contact arm 36, flexible conductor 74, current-carrying bimetal 72, flexible conductor 76, terminal connector 80 and to the terminal strap 82. Since the movable contact arm 36 extends downwardly from its pivot, the arc is established adjacent the bottom of the housing 12 in an arc chamber 84 which is connected by a vent passage 86 to an opening (not shown) in the end of the housing beneath the terminal connector 80.

When the releasable member 62 is in the latched position shown in FIG. 2, the circuit breaker 10 may be manually operated by operation of the operating member 38. Movement of the operating member 38 in a clockwise direction (with respect to FIG. 2) switches the separable contacts 24,26 from the ON or closed position shown in FIG. 2 to the OFF or open position (not shown). The spring 66 biases the contact arm 36 upward into engagement with the operating member 38, in order to bias such operating member against the lower edges of the projection 42 about which the operating member 38 pivots. Movement of the operating member 38 in a counterclockwise (with respect to FIG. 2) direction from the OFF position (not shown) to the ON position (FIG. 2) moves the upper end of the contact arm 36 to the right of the line of action of the spring 66 to move the contact arm 36 to the closed position.

The trip device 32 comprises a flat member or elongated bimetal 72, which is secured at the upper end thereof to a projection 88 of the stationary frame 28. The frame 28 is a flat member, which is secured in place in the housing 12 between projections of such housing and the projection 88, which extends in a direction generally normal to the plane of the frame 28. An elongated rigid magnetic armature or latch member 90 is mounted on a spring 92, which is welded to the high expansion side (toward the left on FIG. 2) of the bimetal 72. The armature 90 extends upward along the high expansion side of the bimetal 72 in a parallel relationship with the bimetal 72 when such bimetal is in the cold or straightened condition. The armature 90 has an opening 94 therein to form a latch surface 96 at the base of such opening. The latch end 64 of the releasable member 62 is formed with a latch surface 98 thereon and a stop surface or fulcrum part 100 thereon. The armature 90 serves as a stop to engage the fulcrum part 100 of the releasable member 62 in the latched position of the releasable member. A magnetic member 102 is mounted on the bimetal 72.

The circuit breaker 10 of FIG. 2 is shown in the latched position wherein the releasable member 62 is latched on the armature 90. The circuit breaker 10 can be manually operated only when the releasable member 62 is in the latched position. The bimetal 72 is biased toward the releasable member 62 and engages the fulcrum part 100 of the rigid releasable member 62. In this position, the latch surface 98 of the releasable member 62 rests on the latch surface 96 of the armature 90 to latch the releasable member 62, thereby preventing clockwise (with respect to FIG. 2) movement of the releasable member 62 about the pivot 60.

Upon occurrence of a sustained lesser overload current above a first predetermined value, the bimetal 72, which is heated by current flowing therethrough, deflects from the position shown in FIG. 2 to a thermally-tripped position (not shown). The bias of the complete bimetal 72 (toward the left of FIG. 2) maintains the armature 90 against the fulcrum part 100 during the deflection of the bimetal 72 to a thermally tripped position. The bimetal 72 deflects to a curvature such that during movement, when the rigid armature 90 is angled to the position with the lower end of the rigid armature 90 being carried by the lower end of the bimetal 72, the armature 90 moves about the fulcrum part 100 with a levering action to move the latch surface 96 of the armature 90 free of the latch 98 of the releasable member 62, in order to release the releasable member 62.

When the releasable member 62 is released, the spring 66 acts to rotate the releasable member 62 in a clockwise (with respect to FIG. 2) direction about the pivot 60 until the releasable member 62 is stopped by engagement thereof with a molded projection 63 on the housing 12. During this movement, the line of action of the spring 66 moves to the right on the pivot, at 50,52, whereupon the spring 66 biases the contact arm 36 in the opening direction and moves the contact arm 36, in order that the line of action of the force exerted by the spring 66 on the operating member 38 shifts across the pivot, at 40,42, and actuates the operating member 38 to the tripped position.

As shown in FIG. 3, the tripped position of the operating member 38 is intermediate the ON and OFF positions. The operating member 38 is stopped in the intermediate or tripped position when an insulating projection (not shown) thereon engages the projection 70 on the releasable member 62. The contact arm 36 is stopped in the open position (not shown) when it engages an insulating projection 101 (shown in FIG. 2) molded integral with the partition wall. Positive separation of the separable contacts 24,26 is provided during a tripping operation by a projection 71 (shown in FIG. 2) extending from the releasable member 62. If such contacts are slow in opening due to sticking, drag or other reasons, the projection 71 engages the inner edge of the contact arm 36 in order to start such arm in the opening direction. The circuit breaker 10 is trip-free in that the breaker will automatically trip open even if the handle 54 is held in the closed position.

The circuit breaker 10 is instantaneously tripped upon the occurrence of a short circuit or severe overload current above a second predetermined value, higher than the first predetermined value, by operation of the magnetic trip of the trip mechanism 32. As can be understood with reference to FIG. 2, the current passing through the bimetal 72 generates magnetic flux which operates through the armature 90, the air gaps between the armature 90 and the magnetic member 102, and through the stationary magnetic member 106. When the current reaches the second predetermined value, this magnetic flux is strong enough to attract the armature 90 toward the stationary magnetic member 106, and the spring 92 flexes permitting the armature 90 and bimetal 72 to move as a unit to the magnetically-tripped position wherein the releasable member 62 is released to trip the circuit breaker 10 in the same manner as discussed above.

Following a magnetic tripping operation, the circuit breaker 10 is reset and relatched in the same manner as discussed above in connection with time-delay thermal tripping operation. The operating mechanism 30 is disclosed in U.S. Pat. No. 4,081,852, which is incorporated by reference herein.

FIG. 3 shows the ground fault interrupter circuit 23, which is part of an electronic trip device 112. The tray portion 14 includes a compartment 110 in which all of the components of the electronic trip device 112 are located. The printed circuit board (PCB) 114 on which the ground fault protection electronic circuit is mounted is supported in the compartment 110. A pigtail 116 is provided in accordance with known practice for connection to a neutral conductor within the circuit breaker 10 and to a neutral bar in a load center (not shown) in which such circuit breaker may be mounted.

As shown in U.S. Pat. No. 5,260,676, which is incorporated by reference herein, a ground fault trip circuit can use a pair of sensing coils (not shown) that encompass a conductor of a pole of a circuit breaker and a neutral conductor, in order to provide a signal to the ground fault protection electronic circuit. When a ground fault condition is sensed, a solenoid 118 is energized, moving plunger 120. A finger 122 on one end of the plunger 120 extends through an opening 124 in the tray 14 and is coupled to the circuit breaker operating mechanism 30, in order that operation of the solenoid 118 results in tripping of the circuit breaker 10.

In the event of a component failure in the ground fault protection electronic circuit, the ground fault detection capability of the circuit breaker 10 can be lost, although the separable contacts 24,26 can remain energized. The present invention trips a circuit interrupter, such as a circuit breaker, in the event of such a component failure. To achieve this function, circuit interrupters constructed in accordance with the embodiment of the invention shown in FIG. 4 include a second trip mechanism 150 for operating an operating mechanism 152 in response to a failure in an electronic trip circuit 154.

The exemplary circuit interrupter, such as molded case ground fault and arc fault circuit breaker 156, includes a housing 158, separable contacts 160 and the operating mechanism 152 for opening and closing such separable contacts. A first trip mechanism 162 includes the electronic trip circuit 154 having a resistor 164, which is energized in response to a trip condition. The exemplary carbon resistor 164 is part of the SCR firing circuit (not shown) for the GFCI and/or AFCI circuit breaker 156. An example of the SCR firing circuit including a ground fault circuit, SCR, trip solenoid coil and resistor is disclosed in U.S. Pat. No. 5,896,262, which is incorporated by reference herein.

The first trip mechanism 162 cooperates with the operating mechanism 152 to trip open the separable contacts 160 in response to the trip condition. The resistor 164 has a body 166, which burns open in response to a failure of the separable contacts 160 to trip open. In accordance with a preferred practice of the invention, the second trip mechanism 150 engages the resistor body 166 and cooperates with the operating mechanism 152 to trip open the separable contacts 160 in response to the resistor body burning open. The operating mechanism 152 and first trip mechanism 162 may be similar to the operating mechanism 30 and trip mechanism 32, respectively, of FIG. 2.

The exemplary operating mechanism 152 includes a trip latch (TL), such as the exemplary armature 170. The first trip mechanism 162 includes a solenoid 172 having a coil 174 and a plunger 176. The electronic trip circuit 154 energizes the coil 174 through the resistor 164 in response to the trip condition. The energized coil 174 normally moves the plunger 176 to engage the armature 170, in order to trip open the separable contacts 160 in response to the trip condition.

For example, the resistor body 166 burns open in response to the plunger 176 failing to trip open the separable contacts 160 through the armature 170 in response to the trip condition. The exemplary resistor 164 is electrically part of the first trip mechanism 162 and is mechanically part of the second trip mechanism 150.

The second trip mechanism 150 includes a trip member 178 and a spring 180 biasing the trip member toward the armature 170. The resistor body 166 normally blocks the trip member 178. The resistor body 166 burns open to release the trip member 178 and trip open the separable contacts 160 through the armature 170 in response, for example, to the plunger 176 failing to trip open the separable contacts 160 through the armature 170 in response to the trip condition. If the circuit breaker 156 does not trip once it is required to trip due to a ground fault or arc fault, then the resistor body 166 burns open after the normal required time to trip the circuit breaker 156 (e.g., without limitation, about 1 second). This is a one-time performance test, since the resistor body 166 burns open only if the first trip mechanism 162 does not open the circuit breaker separable contacts 160, thus, having to rely upon the backup second trip mechanism 150.

As a preferred practice, the resistor 164 is sized such that it is subjected to an overvoltage condition upon a failure (e.g., without limitation, through a failure of the solenoid 172) in the electronic trip circuit 154. This causes the resistor body 166 to burn open, which permanently disables the circuit breaker 156.

As another preferred practice, the resistor 164 is repositioned from a PCB board (not shown) of the first trip mechanism 162 through suitable conductors 182,184, thereby allowing the resistor 164 to be remotely positioned with the second trip mechanism 150. The resistor body 166 is suitably secured to a surface 186 (e.g., such as a PCB) having an opening 188. The resistor body 166 normally physically blocks the plunger 178, which compresses the spring 180 to arm the second trip mechanism 150. At the same time that the spring 180 is compressed, the plunger 178 is pushed back to a loaded position. If the SCR firing circuit (not shown) fails to trip the circuit breaker 156, then the resistor body 166 burns open, which allows the spring 180 to discharge, thereby allowing the plunger 178 to physically move through the opening 188 to its trip position. This prevents the mechanical reset of the GFCI and/or AFCI circuit breaker 156.

Figure 5:
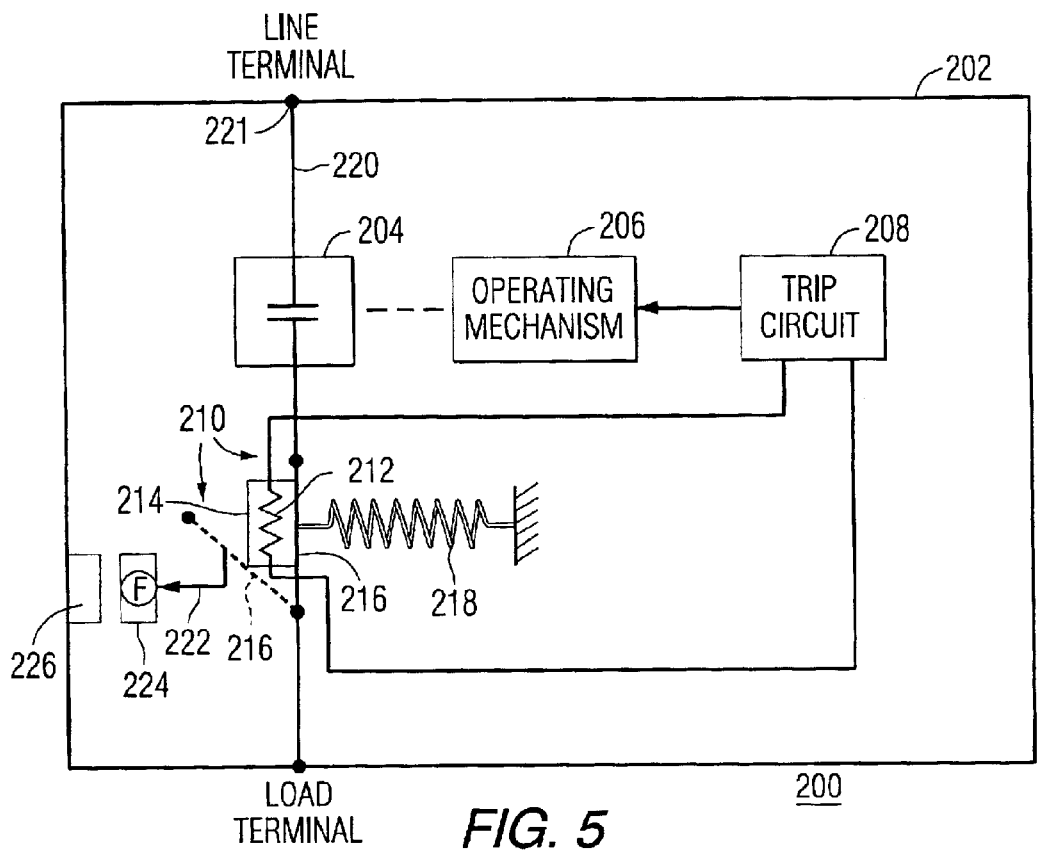
FIG. 5 is a block diagram of a circuit breaker including a second set of separable contacts, spring and resistor in accordance with another embodiment of the invention.

FIG. 5 shows a circuit interrupter, such as the exemplary circuit breaker 200, including a housing 202, first separable contacts 204 within the housing 202, an operating mechanism 206 for opening and closing the first separable contacts 204, a trip circuit 208, and second separable contacts 210 within the housing and electrically connected in series with the first separable contacts 204. As a non-limiting example, the exemplary housing 202 may be a molded case housing of a AFCI, GFCI and/or AFCI/GFCI breaker (e.g., without limitation, having a width of about ¾ in.; 1 in.), although the invention is applicable to a wide range of circuit interrupters employing an electronic trip circuit having a resistor. The trip circuit 208 includes an exemplary carbon resistor 212, which is energized in response to a trip condition. The trip circuit 208 cooperates with the operating mechanism 206 to trip open the first separable contacts 204 in response to the trip condition. The housing 202, first separable contacts 204, operating mechanism 206, and trip circuit 208 are conventional (e.g., as discussed above in connection with the circuit breaker 10 of FIGS. 1–3).

Figure 4:
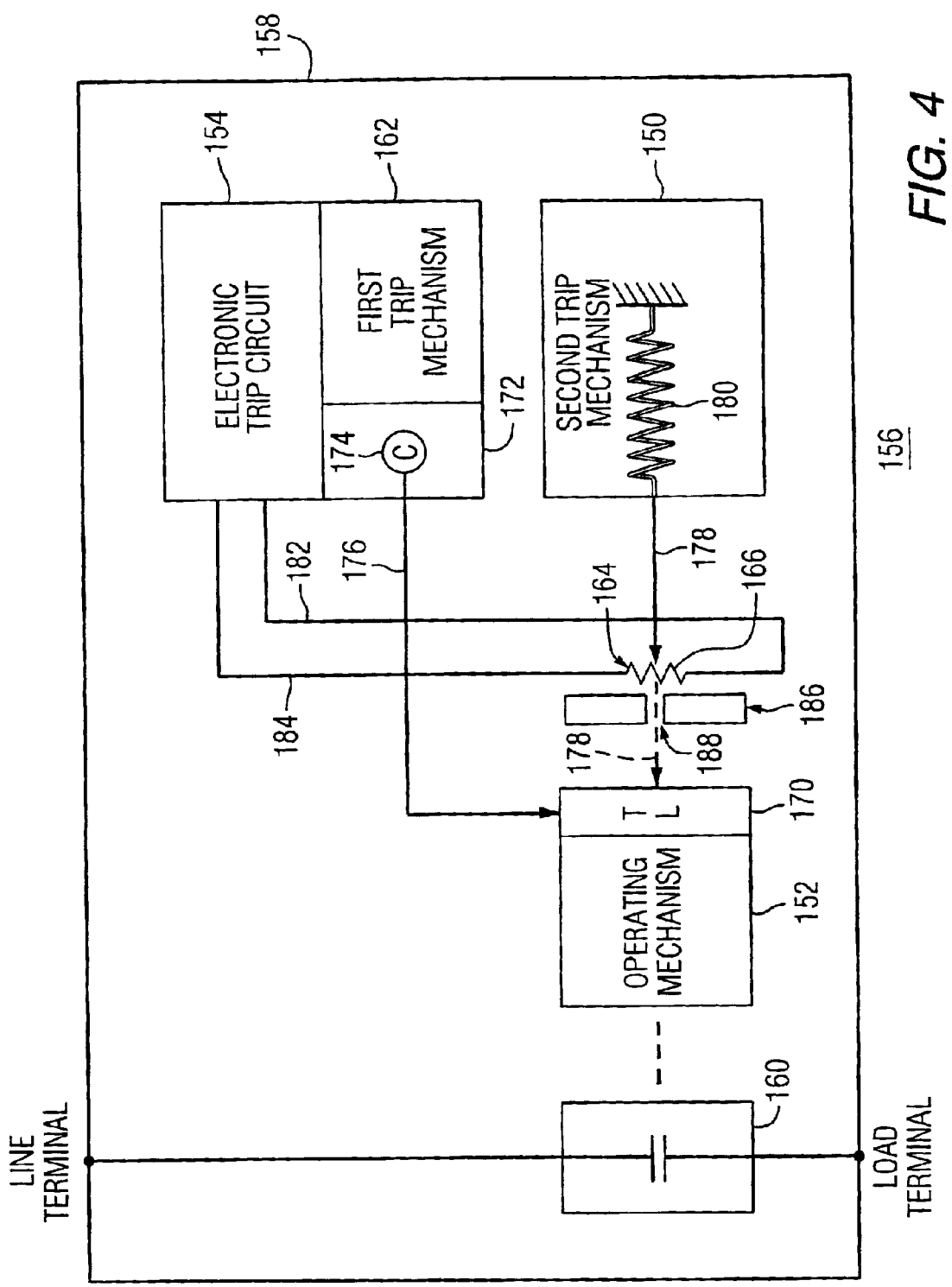
FIG. 4 is a block diagram of a circuit breaker including a second trip mechanism employing an extra trip member and resistor in accordance with an embodiment of the invention.

Similar to the resistor 164 of FIG. 4, the resistor 212 has a body 214, which burns open in response to a failure in the trip circuit 208. The circuit breaker 200 also includes a movable contact arm 216 having an open position (shown in phantom line drawing) for opening the second separable contacts 210 and having a closed position (as shown in FIG. 5) for closing the second separable contacts 210. A main spring 218 biases the movable contact arm 216 toward the open position thereof. Otherwise, the movable contact arm 216 is held in the closed position thereof by the resistor body 214, which suitably engages the movable contact arm 216 to keep the second separable contacts 210 closed. The movable contact arm 216 is movable to the open position thereof in response to the spring 218 after the resistor body 214 burns open.

Alternatively, the spring 218 may indirectly drive the movable contact arm 216 with a plunger (not shown).

Alternatively, the resistor 212 may be soldered in place using the physical size of its body 214 to block a plunger (not shown) driven by the main spring 218 in a charged position. In this alternative, in addition to the main spring 218, there is a second chargeable spring (not shown), which in the charged position biases the movable contact arm 216 to keep the second separable contacts 210 closed.

Similar to the circuit breaker 156 of FIG. 4, the first separable contacts 204 are adapted to receive a line voltage 220 from a line terminal 221. The trip circuit 208 includes an SCR (not shown) and a solenoid (not shown). The trip circuit 208 energizes a solenoid coil (not shown) with the line voltage 220 through the resistor 212 and the SCR in response to the trip condition. The energized solenoid coil normally moves a solenoid plunger (not shown) to engage an operating mechanism trip latch (not shown) to trip open the first separable contacts 204 in response to the trip condition. Similar to the resistor 164 of FIG. 4, the resistor body 214 burns open in response to a failure of the trip circuit 208 (e.g., without limitation, the solenoid plunger failing to trip open the first separable contacts 204 through the trip latch in response to the trip condition). In this embodiment, the second separable contacts 210 are opened and the circuit breaker 200 is disabled until the movable contact arm 216 is reset and the resistor 212 is replaced.

FIG. 5 shows a preferred practice including the movable contact arm 216, second separable contacts 210, spring 218 and resistor 212, in which the movable contact arm 216 has an indicator 222 movable therewith. The indicator 222 has a flag (F) 224, which is visible through an opening 226 of the housing 202 in the open position of the movable contact arm 216.

Figure 6:
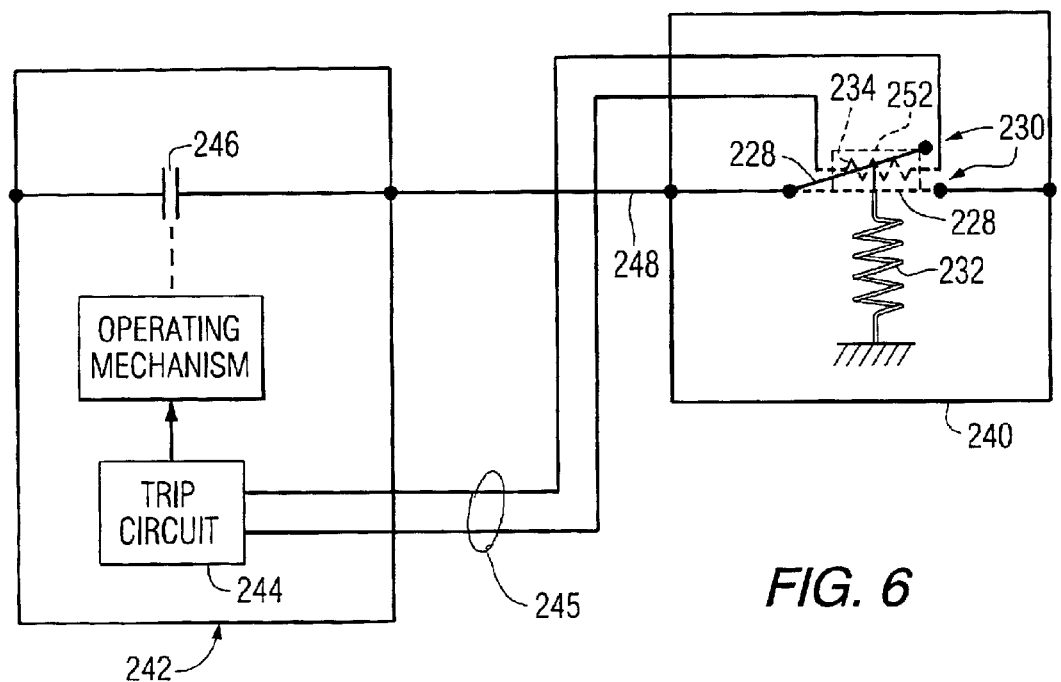
FIG. 6 is a block diagram of an external second set of separable contacts, spring and resistor in accordance with another embodiment of the invention.

FIG. 6 shows another preferred practice in which a movable contact arm 228 (shown open), second separable contacts 230 (shown open), spring 232 and resistor 234 (shown in phantom line drawing) are mounted in a housing 240 external to circuit breaker 242. In this example, the resistor 234 is part of the circuit breaker electronic trip circuit 244 and electrically interconnected therewith by leads 245. The second separable contacts 230 are electrically connected in series with first separable contacts 246 of the circuit breaker 242 through lead 248 (e.g., a suitable electrical conductor). The spring 232 is in compression when the contacts 230 are closed (shown in phantom line drawing). The body 252 (shown in phantom line drawing) of the resistor 234 burns open and unlatches the arm 228 in order to allow the spring 232 to discharge open the arm 228 and, thus, the contacts 230.

Figure 7:
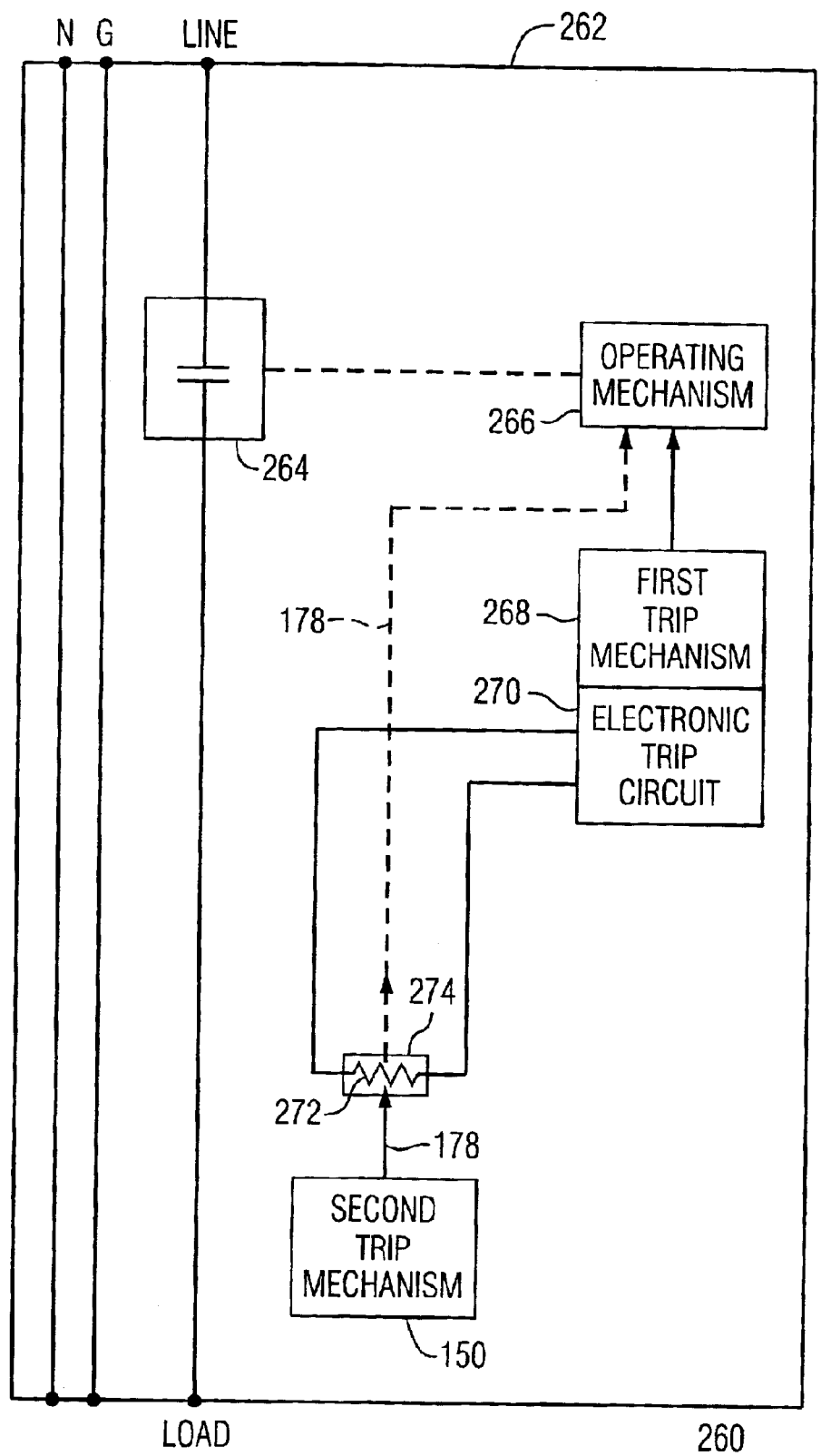
FIGS. 7 and 8 are block diagrams of wall outlet circuit interrupters in accordance with other embodiments of the invention.

FIG. 7 shows a wall outlet circuit interrupter 260 including a housing 262, separable contacts 264, an operating mechanism 266 for opening and closing such separable contacts. A first trip mechanism 268 includes an electronic trip circuit 270 having a resistor 272, which is energized in response to a trip condition. The exemplary carbon resistor 272 is part of the SCR firing circuit (not shown) for the GFCI and/or AFCI electronic trip circuit 270. The first trip mechanism 268 cooperates with the operating mechanism 266 to trip open the separable contacts 264 in response to the trip condition. The resistor 272 has a body 274, which burns open in response to a failure of the separable contacts 264 to trip open. In accordance with a preferred practice of the invention, the wall outlet circuit interrupter 260 includes the second trip mechanism 150 of FIG. 4, which engages the resistor body 274 and cooperates with the operating mechanism 266 to trip open the separable contacts 264 in response to the resistor body burning open.

Figure 8:
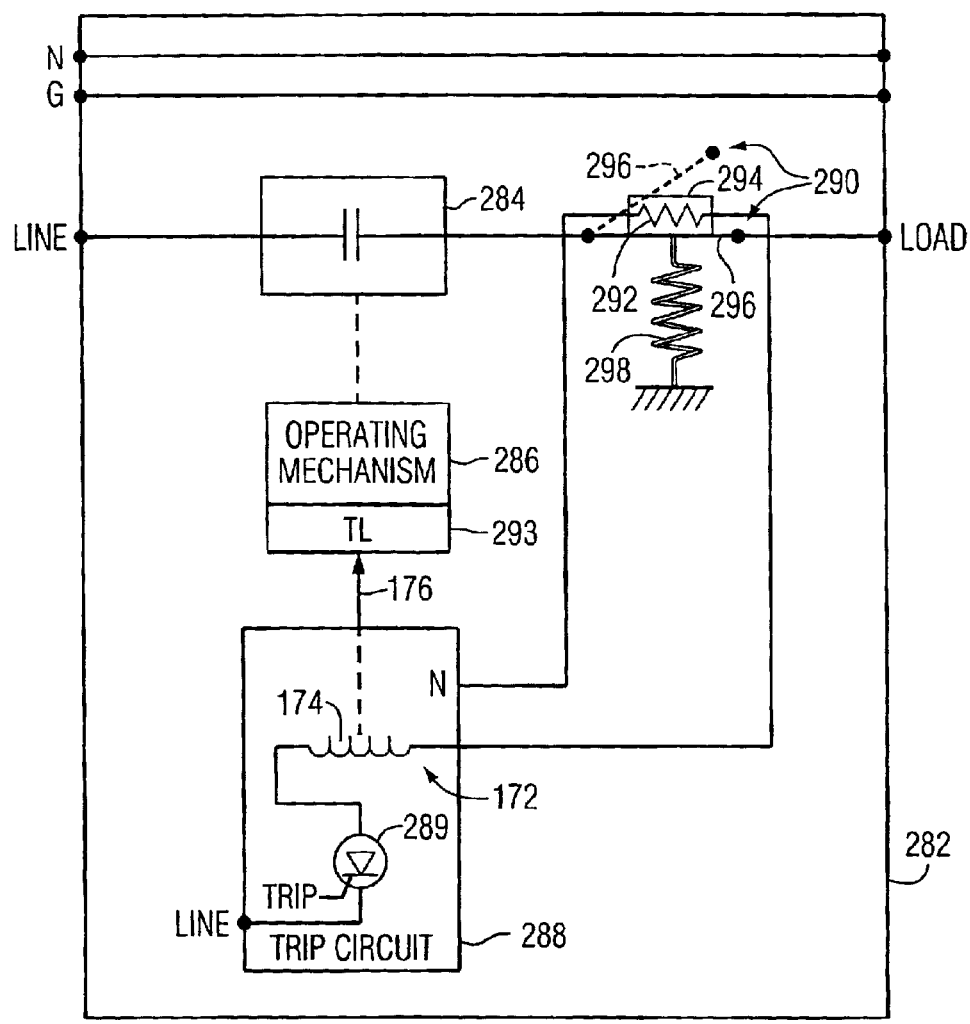

FIG. 8 shows a ground fault and arc fault circuit interrupter (GFCI/AFCI) device, such as the exemplary wall outlet circuit interrupter 280. The wall outlet circuit interrupter 280 includes a housing 282, first separable contacts 284 within the housing 282, an operating mechanism 286 for opening and closing the first separable contacts 284, a trip circuit 288, and second separable contacts 290 electrically connected in series with the first separable contacts 284. The trip circuit 288 includes a resistor 292, which is energized in response to a trip condition. The trip circuit 288 cooperates with the operating mechanism 286 and its trip latch 293 to trip open the first separable contacts 284 in response to the trip condition.

Similar to the resistor 164 of FIG. 4, the resistor 292 has a body 294, which burns open in response to a failure in the trip circuit 288, which applies a line voltage across the series combination of solenoid coil 174 and resistor 292 when SCR 289 is triggered by a trip signal. The wall outlet circuit interrupter 280 also includes a movable contact arm 296 having an open position (shown in phantom line drawing) for opening the second separable contacts 290 and having a closed position (as shown in FIG. 8) for closing the second separable contacts 290. A main spring 298 biases the movable contact arm 296 toward the open position thereof. Otherwise, the movable contact arm 296 is held in the closed position thereof by the resistor body 294, and is movable to the open position thereof in response to the spring 298 after the resistor body 294 burns open.

Figure 9:
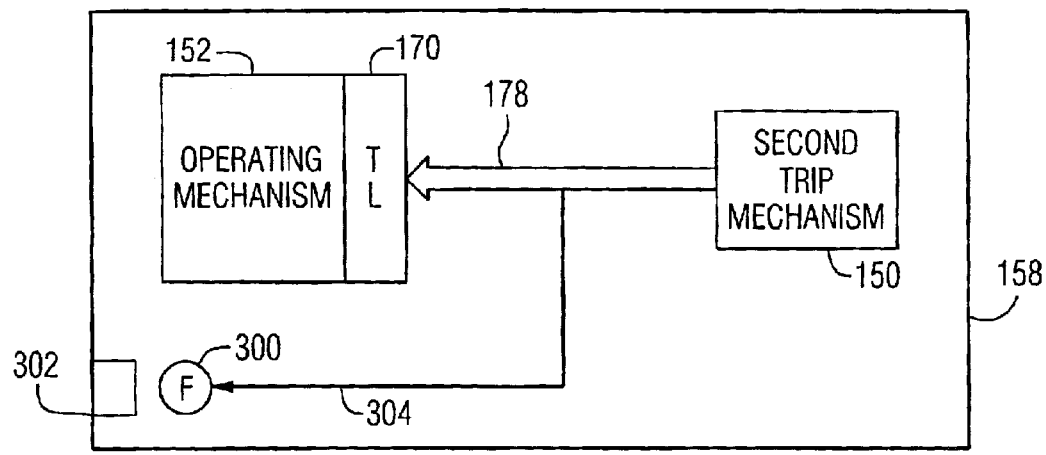
FIG. 9 is a block diagram of a flag for the second trip mechanism of FIG. 4.

FIG. 9 shows a flag (F) 300 for the second trip mechanism 150 of FIG. 4. The housing 158 has a opening 302. The trip member 178 has an indicator 304 movable therewith. The indicator flag 300 is visible through the housing opening 302 (e.g., porthole) with the release of the trip member 178. For example, if the backup system had to be used, then the circuit breaker 156 is no longer a working device. The flag 300 has a symbol (e.g., 0 or X), which is visible through the opening 302 to give the user a warning that the circuit breaker 156 (or outlet) is no longer in working condition and must be replaced.

Although exemplary indicator flags 224, 300 are disclosed, such flags may be employed with any of the circuit interrupters disclosed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the fill breadth of the claims appended and any and all equivalents thereof.

What is claimed is:

1. A circuit interrupter comprising:
a housing;
separable contacts;
an operating mechanism for opening and closing said separable contacts;
a first trip mechanism including a trip circuit having a resistor, which is energized in response to a trip condition, said first trip mechanism cooperating with said operating mechanism to trip open said separable contacts in response to said trip condition, said resistor having a body which burns open in response to a failure of said separable contacts to trip open; and
a second trip mechanism engaging the body of said resistor and cooperating with said operating mechanism to trip open said separable contacts in response to the body of said resistor burning open.

2. The circuit interrupter of claim 1 wherein said operating mechanism includes a trip latch; wherein said first trip mechanism includes a solenoid having a coil and a plunger; wherein said trip circuit energizes said coil through said resistor in response to said trip condition, said energized coil normally moving said plunger to engage the trip latch to trip open said separable contacts in response to said trip condition; and wherein the body of said resistor burns open in response to said plunger failing to trip open said separable contacts through said trip latch in response to said trip condition.

3. The circuit interrupter of claim 2 wherein said second trip mechanism includes a trip member and a spring biasing said trip member toward said trip latch; wherein the body of said resistor normally blocks said trip member; and wherein the body of said resistor burns open to release said trip member, in order to trip open said separable contacts through said trip latch in response to said plunger failing to trip open said separable contacts through said trip latch in response to said trip condition.

4. The circuit interrupter of claim 1 wherein said circuit interrupter is a wall outlet ground fault circuit interrupter (GFCI) device.

5. The circuit interrupter of claim 1 wherein said circuit interrupter is a wall outlet arc fault circuit interrupter (AFCI) device.

6. The circuit interrupter of claim 1 wherein said circuit interrupter is a wall outlet ground fault and arc fault circuit interrupter (GFCI/AFCI) device.

7. The circuit interrupter of claim 1 wherein said circuit interrupter is a molded case circuit breaker.

8. The circuit interrupter of claim 7 wherein said molded case circuit breaker is a ground fault circuit breaker.

9. The circuit interrupter of claim 7 wherein said molded case circuit breaker is an arc fault circuit breaker.

10. The circuit interrupter of claim 7 wherein said molded case circuit breaker is a ground fault and arc fault circuit breaker.

11. The circuit interrupter of claim 3 wherein said housing has a opening; wherein the trip member has an indicator movable therewith; and wherein said indicator is visible through the opening of said housing with the release of said trip member.

12. A circuit interrupter comprising:
a housing;
first separable contacts within said housing;
an operating mechanism for opening and closing said first separable contacts;
a trip circuit including a resistor, which is energized in response to a trip condition, said trip circuit cooperating with said operating mechanism to trip open said first separable contacts in response to said trip condition, said resistor having a body which burns open in response to a failure in said trip circuit;
second separable contacts electrically connected in series with said first separable contacts;
a movable contact arm having an open position for opening said second separable contacts and having a closed position for closing said second separable contacts, said movable contact arm held in the closed position thereof by the body of said resistor, said movable contact arm being movable to the open position thereof in response to the body of said resistor burning open; and
a spring which biases said movable contact arm toward the open position thereof.

13. The circuit interrupter of claim 12 wherein said second separable contacts are within said housing.

14. The circuit interrupter of claim 12 wherein said second separable contacts are external to said housing.

15. The circuit interrupter of claim 12 wherein said housing has a opening; wherein said movable contact arm has an indicator movable therewith; and wherein said indicator is visible through the opening of said housing in the open position of said movable contact arm.

16. The circuit interrupter of claim 12 wherein said operating mechanism includes a trip latch; wherein said first separable contacts are adapted to receive a line voltage; wherein said trip circuit includes an SCR and a solenoid having a coil and a plunger; wherein said trip circuit energizes said coil with said line voltage through said resistor and said SCR in response to said trip condition, said energized coil normally moving said plunger to engage the trip latch to trip open said separable contacts in response to said trip condition, the body of said resistor burning open in response to said plunger failing to trip open said separable contacts through said trip latch in response to said trip condition.

17. The circuit interrupter of claim 12 wherein said circuit interrupter is a wall outlet circuit interrupter device.

18. The circuit interrupter of claim 17 wherein said wall outlet circuit interrupter device is a wall outlet ground fault and arc fault circuit interrupter (GFCI/AFCI) device.

19. The circuit interrupter of claim 12 wherein said circuit interrupter is a molded case circuit breaker.

20. The circuit interrupter of claim 19 wherein said molded case circuit breaker is a ground fault and arc fault circuit breaker.

21. A circuit interrupter comprising:
a housing;
a line terminal;
a load terminal;
a power circuit including separable contacts electrically connected between said line terminal and said load terminal;
an operating mechanism for opening and closing said separable contacts;
a trip circuit including a resistor, which is energized in response to a trip condition, said trip circuit cooperating with said operating mechanism to trip open said separable contacts in response to said trip condition, said resistor having a body which burns open in response to a failure of said separable contacts to trip open;
means for engaging the body of said resistor; and means responsive to said means for engaging for opening said power circuit in response to the body of said resistor burning open.

22. A circuit interrupter comprising:

a housing;

separable contacts;

an operating mechanism for opening and closing said separable contacts;

a first trip mechanism including a trip circuit having a resistor, which is energized in response to a trip condition, said first trip mechanism cooperating with said operating mechanism to trip open said separable contacts in response to said trip condition, said resistor having a body which burns open in response to a failure of said separable contacts to trip open;

a second trip mechanism engaging the body of said resistor and cooperating with said operating mechanism to trip open said separable contacts in response to the body of said resistor burning open; and wherein said operating mechanism includes a trip latch; wherein said first trip mechanism includes a solenoid having a coil and a plunger; wherein said trip circuit energizes said coil through said resistor in response to said trip condition, said energized coil normally moving said plunger to engage the trip latch to trip open said separable contacts in response to said trip condition; and wherein the body of said resistor burns open in response to said plunger failing to trip open said separable contacts through said trip latch in response to said trip condition.

23. A circuit interrupter comprising:

a housing;

a line terminal;

a load terminal;

a power circuit including separable contacts electrically connected between said line terminal and said load terminal;

an operating mechanism for opening and closing said separable contacts;

a trip circuit including a resistor, which is energized in response to a trip condition, said trip circuit cooperating with said operating mechanism to trip open said separable contacts in response to said trip condition, said resistor having a body which burns open in response to a failure of said separable contacts to trip open;

means for engaging the body of said resistor;

means responsive to said means for engaging for opening said power circuit in response to the body of said resistor burning open; and wherein said separable contacts are first separable contacts; wherein said power circuit further includes second separable contacts electrically connected in series with said first separable contacts between said line terminal and said load terminal; wherein said means for engaging includes a movable contact arm having an open position for opening said second separable contacts and having a closed position for closing said second separable contacts, said movable contact arm held in the closed position thereof by the body of said resistor, said movable contact arm being movable to the open position thereof in response to the body of said resistor burning open; and wherein said means responsive to said means for engaging includes a spring which biases said movable contact arm toward the open position thereof.

24. A circuit interrupter comprising:

a housing;

a line terminal;

a load terminal;

a power circuit including separable contacts electrically connected between said line terminal and said load terminal;

an operating mechanism for opening and closing said separable contacts;

a trip circuit including a resistor, which is energized in response to a trip condition, said trip circuit cooperating with said operating mechanism to trip open said separable contacts in response to said trip condition, said resistor having a body which burns open in response to a failure of said separable contacts to trip open;

means for engaging the body of said resistor;

means responsive to said means for engaging for opening said power circuit in response to the body of said resistor burning open; and wherein said means for engaging the body of said resistor includes a trip member; wherein said means responsive to said means for engaging is a trip latch; wherein the body of said resistor normally blocks said trip member; and wherein the body of said resistor burns open to release said trip member, in order to trip open said separable contacts through said trip latch.

* * * * *